July 5, 1949.  J. R. WEAVER  2,475,117
MECHANICAL MOVEMENT

Filed Feb. 1, 1946  2 Sheets-Sheet 1

INVENTOR.
John R. Weaver
BY
ATTORNEY.

July 5, 1949.　　　　J. R. WEAVER　　　　2,475,117
MECHANICAL MOVEMENT

Filed Feb. 1, 1946　　　　　　　　　　2 Sheets-Sheet 2

INVENTOR.
John R. Weaver
BY
Attorney.

Patented July 5, 1949

2,475,117

UNITED STATES PATENT OFFICE 2,475,117

MECHANICAL MOVEMENT

John R. Weaver, Denver, Colo.

Application February 1, 1946, Serial No. 644,885

9 Claims. (Cl. 74—34)

This invention relates to mechanical movements, and more particularly to mechanical movements or linkages operable to convert rectilinear reciprocation into rotary motion, and has as an object to provide an improved such movement.

A further object of the invention is to provide an improved construction and relationship of elements constituting means for manifesting rectilinear reciprocation as unidirectional rotary motion.

A further object of the invention is to provide an improved mechanical movement automatically operable to apply the forces of a linearly reciprocatory cycle with efficient, uniform torque, rotary effect.

A further object of the invention is to provide an improved gear-type mechanical movement for the conversion of rectilinear reciprocation into rotary motion while maintaining the gear elements of the device at all times in meshed relation with their associated power-transmitting members.

A further object of the invention is to provide improved means automatically effective to alternately engage elements oppositely responsive to a reciprocatory cycle with and to unidirectionally drive a rotary member.

A further object of the invention is to provide an improved mechanical movement for the transmission of reciprocatory motion to effect rotary motion that is positive and efficient in fully automatic operation, simple of convenient embodiment in a variety of specific structures, adaptable to meet the requirements of various operating conditions and situations, and productive of enhanced advantage in use.

With the foregoing and other objects in view, my invention consists in the construction, arrangement, and combination of elements hereinafter set forth, pointed out in my claims, and illustrated by the accompanying drawings, in which—

Figure 1:
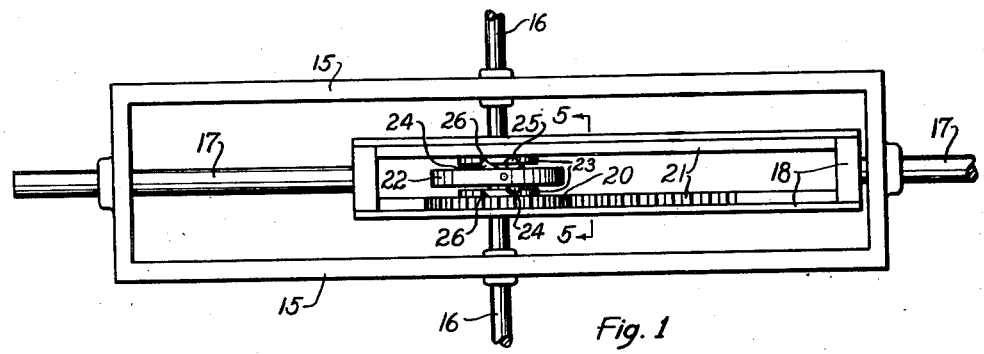
Figure 2:
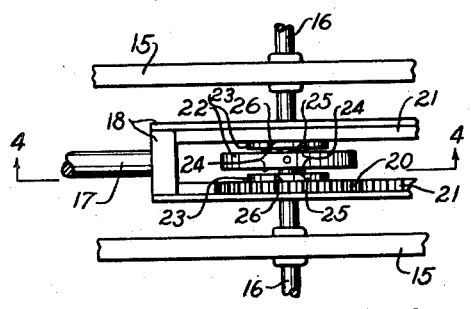
Figure 3:
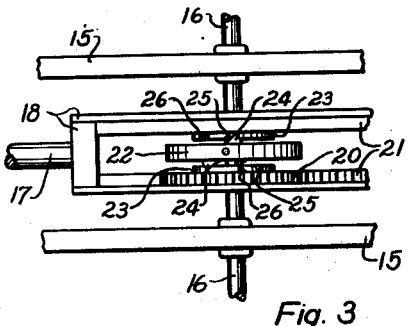
Figures 4, 5:
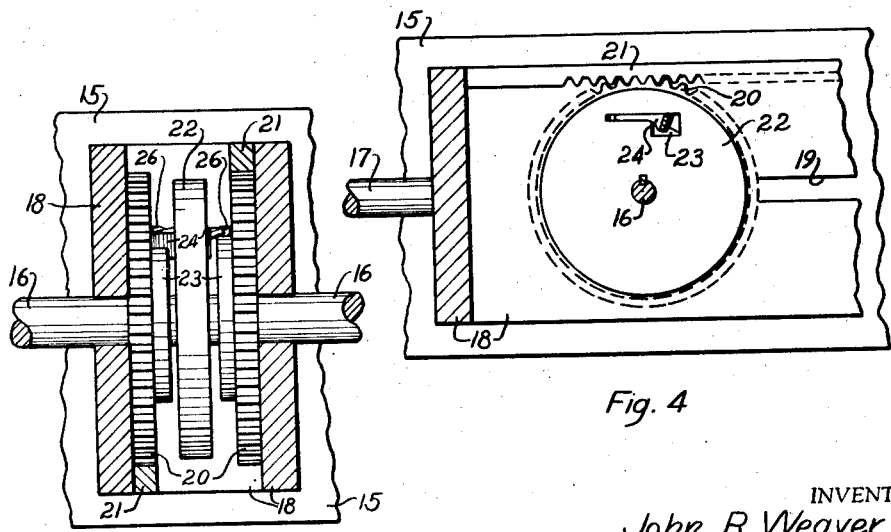
Figure 6:
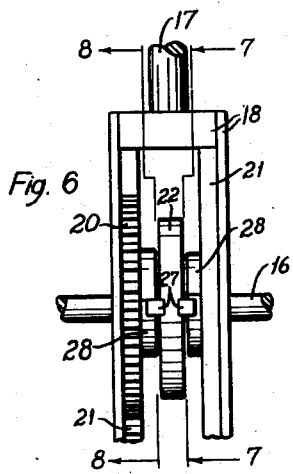
Figures 7, 8:
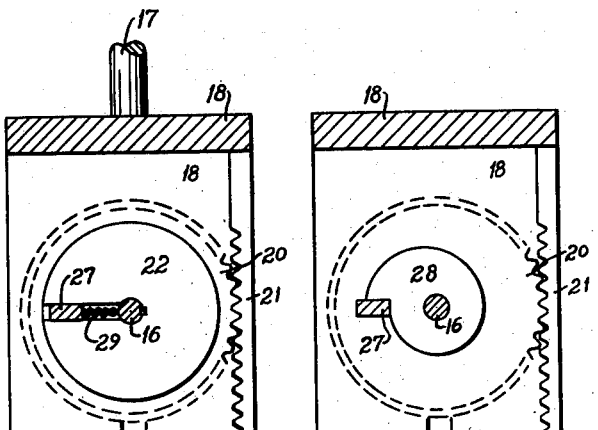
Figure 9:
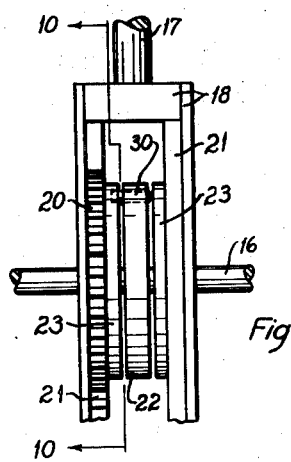
Figure 10:
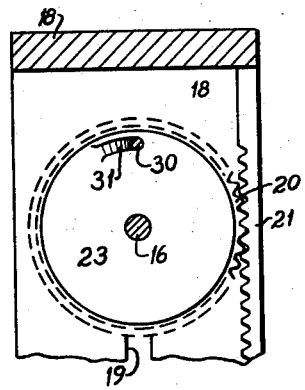
Figure 11:
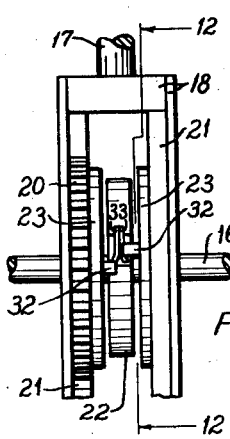
Figure 12:
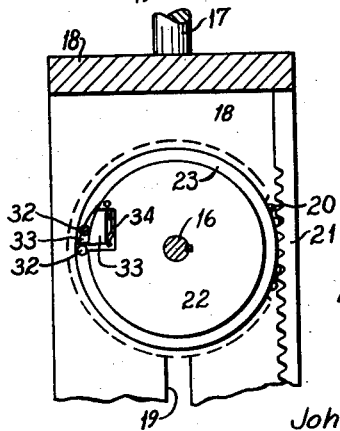

Figure 1 is a top plan view of typical structure embodying and operable to give effect to the principles of the invention. Figure 2 is a fragmentary plan view of the elements shown centrally of Figure 1 at a relatively slightly advanced stage of their cooperative cycle. Figure 3 is a view similar to Figure 2 illustrating the cooperating elements in a still further advanced stage of their cycle. Figure 4 is a fragmentary, detail section, on an enlarged scale, taken on the indicated line 4—4 of Figure 2. Figure 5 is a fragmentary, detail section, on a further enlarged scale, taken on the indicated line 5—5 of Figure 1. Figure 6 is a fragmentary plan view illustrating automatic clutch means employable alternatively to the arrangement shown in the preceding views. Figure 7 is a fragmentary, detail section taken on the indicated line 7—7 of Figure 6. Figure 8 is a fragmentary, detail section taken on the indicated line 8—8 of Figure 6. Figure 9 is a view similar to Figure 6 illustrating yet another alternatively employable construction of automatic clutch means. Figure 10 is a fragmentary, detail section taken on the indicated line 10—10 of Figure 9. Figure 11 is a view similar to Figures 6 and 9 illustrating an additional alternatively employable automatic clutch means construction. Figure 12 is a fragmentary, detail section taken on the indicated line 12—12 of Figure 11.

In the construction of the improvement as shown in Figures 1 through 5, the numeral 15 designates a rigid, skeleton frame of any material and specific construction suited to its purpose of mounting and operatively interrelating the driving and driven elements of the assembly, which frame conveniently has a length several times its width, defines an elongate open area for the accommodation of movable elements of the device, rotatably journals a driven shaft 16 disposed transversely of its midportion, and slidably mounts, guides, and supports power-transmitting, straight stems 17 aligned to reciprocate in a path longitudinally of said frame and at right angles to the shaft 16. Adjacent ends of the stems 17 are securely fixed to and exteriorly of the opposite ends of a rigid closed loop or elongate yoke 18 in longitudinal alignment therebetween and within the frame 15, said stems and yoke comprising a unit reciprocable relative to said frame, and the parallel long sides of the yoke 18 are correspondingly longitudinally slotted, as at 19, to embrace and slidably accommodate the shaft 16. The axes of the shaft 16 and stems 17 preferably define a common plane longitudinally bisecting the yoke 18, in which arrangement the yoke slots 19 symmetrically divide their respective yoke side members. The stems 17 are adapted to receive and transmit power from linearly reciprocable elements, such as engine pistons, directly connected therewith, it being obvious that pistons arranged to work in opposition may be connected with the remote ends of the two stems 17 or that but one piston associated with either of said stems may be employed to actuate the movement, according to the particular design of engine or prime mover employed, the longitudinal relationship between the frame 15 and yoke 18 being, in any event, such as will permit full reciprocation of said yoke, corresponding with the stroke cycle of the associated engine, within said frame.

Inwardly adjacent each yoke 18 long side member, a gear 20 is mounted on and for free rotation about the shaft 16 in constant meshing relation with a rack bar 21 fixed to or formed on, and longitudinally along, the margin of the proximate yoke member, said gears 20 being identical and said rack bars 21 being oppositely disposed on the yoke 18 so that the gears meshing therewith are caused to rotate simultaneously and in opposite directions as the yoke and stem assembly reciprocates relative to the frame 15 and shaft 16, the said gears 20 coming simultaneously to a full stop and then reversing their directions of rotation as the yoke and stem assembly reaches each limit of its range of reciprocation and reverses its direction of travel. As above noted, there is no direct driving relation between the gears 20 and the shaft 16, said gears rotating on and freely about said shaft under the rack-bar-transmitted influence of yoke reciprocation, one of said gears rotating in a given direction during one phase of yoke reciprocation and the other of said gears rotating in the corresponding direction during the alternate phase of yoke travel, so that clutch means associated with said shaft and automatically operable to alternately engage said gears in driving relation with the shaft in response to change in direction of yoke travel is productive of substantially-uniform, unidirectional rotation, continuous save for the instant of clutch engagement alternation, of said shaft.

Clutch means operable in the manner and to the ends above set forth may vary throughout a considerable range of structural detail, as typified by the views of the drawings, certain of which constructions may present operative advantage for use in movements having particular speed, power, and stroke characteristics. The clutch means shown in Figures 1 through 5 includes a disc or wheel member 22 fixed to and for rotation with the shaft 16 between and in equal spacing from the adjacent sides of the gears 20, cylindrical, concentric hubs 23 on and projecting axially from the gear 20 inner faces and into close adjacency with the adjacent disc 22 surfaces, and a latching detent 24 pivoted on an axis radially of the disc 22 to swing in a plane parallel to the shaft 16 axis between alternate operative engagement with the gear hubs 23. In this arrangement, the detent 24 may have arcuately-margined ends of such width as to approximately equal the axial distance from one gear 20 inner face to the remote disc 22 side surface, a midportion width approximately equal to the disc 22 thickness, a thinner end leading in the direction of desired shaft rotation, and a thicker end, widened radially and inwardly of the disc 22, trailing in the desired direction of rotation, and said detent is conveniently mounted for free oscillation in a slot intersecting the disc 22 about a radial pivot engaging through the detent midportion. The slot accommodating the detent 24 is so positioned relative to the hub 23 diameters as to dispose corners of the thinner or leading end of said detent to alternately overlie the hub peripheries, in which detent location corners of the thicker trailing end are adapted to alternately engage in marginal notches 25 formed to open radially outwardly and axially through the inner faces of said hubs. In the arrangement shown, each hub 23 is provided with one notch 25 in such relationship, the effective circumferences of the gears 20 being equal to twice the yoke 18 reciprocatory range, as to bring said notches into substantial registration axially of the assembly at each limit of yoke 18 travel, the said positions of notch registration being alternately on opposite sides of the shaft 16, and the detent thicker end, being at all times corner-engaged with one or the other of said notches 25, is hence disposed for oscillation from one and into the other of said notches at each end of the yoke stroke. With one detent trailing end corner engaged in a notch 25, the diagonally opposite leading end corner overlies the periphery of the other hub 23, so that, the said gears and hubs being oppositely rotated, a bevel-faced abutment or stud 26 fixedly upstanding from the hub periphery is brought into bearing against the said detent leading end arcuate margin as the yoke approaches the pertinent limit of its travel and as the hub notches 25 approach registration, the inclination of the stud 26 face cooperating with the arcuate detent end margin to swing the detent about its pivot and into trailing end corner engagement with the notch 25 of the hub whereof the stud 26 has just functioned; such oscillation of the detent releasing it from its previous hub engagement and establishing such connection with the other hub as serves to transmit reverse travel of the yoke through the newly-engaged gear to continue rotative driving of the disc 22 and shaft 16 in the direction previously induced. Each time that the notches 25 approach registration adjacent a limit of yoke reciprocation, the stud 26 on the hub 23 not engaged by the detent 24 functions to reverse the detent position at the instant the stroke limit has been attained and thereby maintains a driving relation between the disc 22 and gear 20 driven by the yoke in the desired direction of shaft rotation.

The operative cycle above described is exemplified in Figures 1, 2 and 3. In Figure 1 the yoke 18 is approaching the limit of its range of travel to the right with consequent counter-clockwise rotation of the lower gear 20, clockwise rotation of the upper gear 20, and approaching registration of the notches 25. Through detent 24 engagement with the lower gear hub notch 25, the disc 22 and shaft 16 are rotated counter-clockwise and, by virtue of the close approach to the yoke stroke end, the stud 26 of the upper gear is bearing against the detent leading edge corner and has started oscillation of the detent. In Figure 2 yoke travel to the right has been completed, the gears 20 are at rest at the instant of directional reversal, the notches 25 are in registration, the stud 26 of the upper gear has cleared the detent forward corner and consequently rocked the detent almost free from the lower gear hub notch and into initial engagement with the notch of the upper gear hub, and the elements are positioned for reverse yoke travel. In Figure 3 the yoke 18 has begun its travel to the left, the lower gear 20 through its clockwise rotation has completed detent oscillation into full engagement with the upper gear hub notch, the detent leading end now overhangs the lower gear hub 23 in the path of said gear hub stud 26, and the counter-clockwise rotation of the upper gear 20 operates through its detent engagement to continue counter-clockwise drive of the disc 22 and shaft 16.

The structurally-alternative clutch means of Figures 6, 7 and 8 utilizes the disc 22 which, in place of the slot and detent 24, in this instance is formed with registered, like, slideways or grooves radially intersecting its opposite faces and opening through its periphery to each slidably accommodate a drive block 27 having a dimension axially of the disc considerably greater than the depth of its mounting groove. In place of the cylindrical hubs 23, the gears 20 have similar hubs 28 peripherally worked to the form of spiral cams wherein the minimum and maximum radial dimensions are joined by radial planes constituting driving faces. Portions of the blocks 27 projecting axially beyond the disc 22 overhang and slidably bear at their inner ends against the spiral margins of the adjacent cam hubs 28, a retractile spring 29, or equivalent element, connecting between each block 27 and a fixed point of said disc 22 or shaft 16 to yieldably urge the associated block inwardly of the assembly and into constant inner end engagement with its adjacent cam hub, so that, the elements of the assembly being suitably proportioned and properly correlated, gear 20 rotation deriving from yoke 18 reciprocation operates to alternately position one of the blocks 27 in driven relation with and against the radial driving face of its associated cam hub, for consequent rotation of the disc 22 and shaft 16; while at the same time the other block 27 rides on its hub 28 spiral margin and is urged radially outwardly of the disc 22 into position to snap inwardly along and into driven relation with its cam hub driving face when the yoke 18 reaches a limit of its travel and reversal of gear rotation direction impends.

The clutch means construction of Figures 9 and 10 utilizes the disc 22 in association with cylindrical gear hubs 23 conveniently of the same diameter as the disc, and includes a straight pin 30, of a length exceeding the disc axial dimension, disposed in spaced, axially-parallel relation with the shaft 16 to slide in and through, and to project at one end or the other beyond, a hole formed for such purpose through and adjacent the margin of the disc 22. The pin 30 being of length greater than the disc thickness, one end thereof will extend outwardly as a stud beyond the adjacent disc face when the other pin end is flush with its side of the disc, and such stud projection is arranged to engage within a suitably-disposed hole formed for its reception in and to open through the inner face of the adjacent hub 23, thus linking the disc in driven relation with one of the gears 20. Each of the hubs 23 is provided with a hole for the reception of a pin 30 projecting end, which holes are arranged to register with each other, and to align with the pin 30, at a suitable point of the operative cycle adjacent each limit of yoke 18 reciprocation, so that said pin may be axially shifted from engagement with one and into engagement with the other of said hubs, such shifting of the pin being automatically accomplished by means of a short cam channel 31 in leading relation in the direction of desired disc and shaft rotation with each of the hub 23 pin-receiving holes, said cam channel merging at its deeper end with the bottom of the pin-receiving hole and inclining therefrom towards the disc 22 to ultimately merge with the inner face of its hub. Obviously, when a hub 23 engaged by the pin 30 reverses its direction of rotation at the end of a yoke stroke, the cam groove 31 thereof operates to shift the pin 30 axially and into engagement of its remote end with the hole of the other and oppositely rotating hub 23, thereby alternately connecting the disc 22 in driven relation with and for unidirectional rotation by the hubs 23 when and as the gears associated with said hubs respond to yoke actuation in the desired direction of rotation.

The modified clutch means construction according to Figures 11 and 12 employs the typical assembly of cylindrical gear hubs 23 and disc 22, said disc in this instance having a diameter less than that of said hubs to rotate just within the orbits of studs 32 fixedly projecting axially from the hub inner faces adjacent the hub margins, said studs overlying the disc rim in close clearing relation of their free ends. A marginal recess or notch in the disc 22 receives and at times houses a pair of detent levers 33 hinged at their ends leading in the direction of desired disc rotation to said disc for separate actuation in the disc plane and within the disc thickness, suitable spring means 34 engaging between the disc recess and inner margins of said levers functioning to normally urge the latter outwardly of the disc for projection of their trailing ends as radially positioned abutments beyond the disc periphery and in obstructing relation with the stud 32 orbital paths. Thus, with the elements of the assembly properly positioned and correlated, opposite rotation of the gear hubs 23 deriving from yoke 18 reciprocation operates through engagement of one of the studs 32 with the abutment of its corresponding lever 33 to rotate the disc 22 and shaft 16, until, just prior to the instant of gear rotation reversal, the oppositely-traveling stud 32 rides over and depresses its lever 33 as the two studs approach axial alignment as the yoke reaches the limit of its range of travel, at which instant the depressed lever 33 clears its stud 32 and snaps outwardly to form an abutment against which the just-cleared stud may bear to continue disc and shaft rotation during reverse yoke travel.

As is readily apparent, speed of shaft 16 rotation and power transmitted to and through said shaft, both relative to the coordinate factors of yoke 18 actuation, may be varied and adjusted in the construction of the improvement through variation in the relative size of the gears 20 employed, and consequent variation in the effective lever arm through which torque is applied to turn said shaft, the resulting variation in effective gear circumference being conveniently accommodated to the length of yoke stroke through the use of additional automatically-responsive clutch elements to act on the disc 22 in the manner shown and described, such additional elements being disposed to react for unidirectional drive of said disc at each end of the yoke stroke corresponding to a uniform angular displacement of the gears 20. For example, the arrangements of clutch elements shown and described provide for continuous disc drive with one hundred and eighty degrees of gear rotation to each yoke stroke, diametrically duplicating the provision of clutch elements provides for the desired drive with ninety degrees of gear rotation to each yoke stroke, three sets of clutch elements in uniform angular spacing provides for the desired drive with sixty degrees of gear rotation to each yoke stroke, and four sets of clutch elements in uniform angular spacing provides for forty-five degrees of gear rotation to each yoke stroke, all such multiplication of clutch element sets being but evidence of skill and detail design well within the scope and teachings of the foregoing disclosure.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A mechanical movement of the character described, comprising an elongate, closed yoke frame mounted for rectilinear reciprocation, a shaft journaled for rotation in perpendicular relation with the yoke frame path of travel and operatively traversing said yoke frame, a pair of like gears spaced apart for independent rotation on said shaft within said yoke frame, oppositely-disposed rack bars on said yoke frame in constant meshing relation with said gears to simultaneously and oppositely rotate said gears as said yoke frame is reciprocated, a clutch disc fixed to and revoluble with said shaft between said gears, and means carried by said disc shiftably responsive to gear and disc relative rotations to automatically and alternately connect said disc and the associated shaft in driven relation with one of said gears at the opposite ends of the yoke frame stroke.

2. A mechanical movement of the character described, comprising an elongate, rectilinearly-reciprocable, closed yoke frame, a shaft rotatably traversing said yoke frame perpendicular to the path of frame travel, like gears spaced apart for independent rotation on said shaft within said yoke frame, rack bars carried by said yoke frame on opposite sides of said shaft and each in constant meshing relation with one of said gears, a clutch disc fixed to and revoluble with said shaft between said gears, and means carried by said disc shiftably responsive to gear and disc relative rotations to automatically and alternately connect said disc and the associated shaft in driven relation with one of said gears at the opposite ends of the yoke frame stroke.

3. A mechanical movement of the character described, comprising an elongate, rectilinearly-reciprocable, closed yoke frame, a shaft rotatably traversing said yoke frame perpendicular to the path of frame travel, like gears spaced apart for independent rotation on said shaft within said yoke frame, rack bars carried by said yoke frame on opposite sides of said shaft and each in constant meshing relation with one of said gears, a clutch disc fixed to said shaft between said gears, a detent shiftably associated with said clutch disc for alternate driven connection of said clutch disc with said gears, and means effective at each end of the yoke frame stroke to automatically shift said detent out of operative engagement with one and into operative engagement with the other of said gears.

4. A mechanical movement of the character described, comprising an elongate, rectilinearly-reciprocable, closed yoke frame, a shaft rotatably traversing said yoke frame perpendicular to the path of frame travel, like gears spaced apart for independent rotation on said shaft within said yoke frame, rack bars carried by said yoke frame on opposite sides of said shaft and each in constant meshing relation with one of said gears, a clutch disc fixed to said shaft between said gears, a detent shiftably associated with said clutch disc for alternate driven connection of said clutch disc with said gears, and like means in fixed association with each of said gears effective through gear rotation reversal at the end of each yoke frame stroke to automatically shift said detent from driven engagement with one and into driven engagement with the other of said gears.

5. In a mechanical movement of the character described having an elongate, rectilinearly-reciprocable, closed yoke frame and a shaft rotatably traversing said yoke frame perpendicular to the path of frame travel, means for automatically applying the yoke frame reciprocations to effect unidirectional rotation of said shaft, said means comprising like gears spaced apart for independent rotation on said shaft within said yoke frame, rack bars carried by said yoke frame on opposite sides of said shaft and each in constant meshing relation with one of said gears, a clutch disc fixed to and revoluble with said shaft between said gears, and means carried by said disc shiftably responsive to gear and disc relative rotations automatically actuatable at each end of the yoke frame stroke to alternately link said shaft in driven relation with one of said gears.

6. In a mechanical movement of the character described having an elongate, rectilinearly-reciprocable, closed yoke frame and a shaft rotatably traversing said yoke frame perpendicular to the path of frame travel, means for automatically applying the yoke frame reciprocations to effect unidirectional rotation of said shaft, said means comprising like gears spaced apart for independent rotation on said shaft within the yoke frame, rack bars carried by said yoke frame on opposite sides of said shaft and each in constant meshing relation with one of said gears, a clutch disc fixed to said shaft between said gears, a detent shiftably associated with said clutch disc for alternate driven connection of said clutch disc with said gears, and like elements in fixed association with each of said gears effective through gear rotation reversal at the end of each yoke frame stroke to automatically shift said detent from driven engagement with one and into driven engagement with the other of said gears.

7. In a mechanical movement of the character described having an elongate, rectilinearly-reciprocable, closed yoke frame, a shaft rotatably traversing said yoke frame perpendicular to the path of frame travel, like gears spaced apart for independent rotation on said shaft within the yoke frame, rack bars carried by said yoke frame on opposite sides of said shaft and each in meshing relation with one of said gears, and a clutch disc fixed to said shaft between said gears, means automatically effective adjacent the yoke frame stroke ends to alternately connect said clutch disc with and for unidirectional rotation by said gears, said means comprising axially and peripherally opening recesses in the gear faces adjacent said clutch disc adapted to register at the ends of the yoke frame stroke, a double-ended latching detent carried by and swingable about a pivot radially of the clutch disc for engagement of corners on one of its ends in driven relation with one or the other of said recesses, and studs on said gears spaced relative to the corresponding recesses for alternate engagement with the other detent end at the yoke frame stroke limit and consequent actuation of said detent about its pivot from driven engagement with one and into driven engagement with the other of said recesses.

8. In a mechanical movement of the character described having a rotatable shaft, a clutch disc fixed to said shaft, gears independently rotatable on said shaft adjacent the opposite sides of said clutch disc, and a rack-equipped, reciprocable frame engaging said gears for simultaneous, opposite rotation thereof, means for translating the oscillatory rotation of said gears into unidirectional rotation of said clutch disc and shaft, said means comprising spiral-margined cam hubs on said gears adjacent the clutch disc, radial planes connecting the minimum and maximum radial dimensions of said hubs and adapted to register axially of the assembly at each limit of frame reciprocation, slide bearing grooves radially intersecting the clutch disc opposite sides in registration axially thereof, blocks slidable in said grooves with their inner ends overhanging the respectively adjacent cam hub spiral margins, and resilient means yieldably urging said blocks to the inner limits of their slidable range.

9. In a mechanical movement of the character described having a rotatable shaft, a clutch disc fixed to said shaft, gears independently rotatable on said shaft adjacent the opposite sides of the clutch disc, and a rack-equipped, reciprocable frame engaging said gears for simultaneous, opposite rotation thereof, means for translating the oscillatory rotation of said gears into unidirectional rotation of said clutch disc and shaft, said means comprising a pin of length greater than the clutch disc thickness slidably intersecting said disc in spaced, parallel relation with the axis thereof, socket holes opening through the gear faces adjacent the clutch disc in position to align with said pin at each limit of frame reciprocation, and an arcuate cam channel communicating between each socket hole bottom and the adjacent gear face disposed to axially shift said pin from end engagement within one and into opposite end engagement within the other of said socket holes as an incident of gear rotation reversal.

JOHN R. WEAVER.

REFERENCES CITED

The following references are of record in the file of this patent:

UNITED STATES PATENTS

| Number | Name | Date |
| --- | --- | --- |
| 337,973 | Manger | Mar. 16, 1886 |
| 994,627 | Workman | June 6, 1911 |
| 1,136,137 | Hunter | Apr. 20, 1915 |